US012604291B2

(12) United States Patent
Liu et al.

(10) Patent No.: US 12,604,291 B2
(45) Date of Patent: Apr. 14, 2026

(54) SECURE PROCESS FOR DEVICE REGISTRATION WITH A SERVICE

(71) Applicant: T-MOBILE INNOVATIONS LLC, Overland Park, KS (US)

(72) Inventors: Cheng Chang Liu, Overland Park, KS (US); Jason Bart Marshall, Olathe, KS (US); WeiQun Yan, Overland Park, KS (US); Hongkun Jin, Overland Park, KS (US); Abdul Khaliq Shaik, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 442 days.

(21) Appl. No.: 18/180,579

(22) Filed: Mar. 8, 2023

(65) Prior Publication Data

US 2024/0306111 A1     Sep. 12, 2024

(51) Int. Cl.
| | |
|---|---|
| *H04W 4/00* | (2018.01) |
| *H04W 12/041* | (2021.01) |
| *H04W 12/0431* | (2021.01) |
| *H04W 12/06* | (2021.01) |
| *H04W 60/04* | (2009.01) |

(52) U.S. Cl.
CPC ......... *H04W 60/04* (2013.01); *H04W 12/041* (2021.01); *H04W 12/0431* (2021.01); *H04W 12/06* (2013.01)

(58) Field of Classification Search
CPC .... H04L 9/321; H04L 9/3263; H04W 12/041; H04W 12/0431; H04W 12/06; H04W 60/04; H04W 72/04; H04W 72/50
See application file for complete search history.

(56) References Cited

U.S. PATENT DOCUMENTS

| | | | | |
|---|---|---|---|---|
| 12,113,912 | B2 * | 10/2024 | Jang | H04L 9/3263 |
| 2006/0047960 | A1 * | 3/2006 | Ono | H04L 9/0891 |
| | | | | 713/171 |
| 2019/0036917 | A1 * | 1/2019 | Sun | H04L 63/12 |
| 2019/0140844 | A1 * | 5/2019 | Brown | H04L 63/0428 |
| 2021/0234858 | A1 * | 7/2021 | Nakagawa | H04L 63/0838 |
| 2022/0094546 | A1 * | 3/2022 | Ying | H04L 9/30 |
| 2022/0303268 | A1 * | 9/2022 | Karnaros | G06F 21/36 |
| 2023/0076669 | A1 * | 3/2023 | Acharya | H04L 9/0816 |

* cited by examiner

*Primary Examiner* — Shantell L Heiber

(57) ABSTRACT

Technology is disclosed herein for registering a user device with a service. In an implementation, a service receives a request from a user device to begin a registration process. The request includes registration data and the public key of an asymmetric key pair. The service stores the public key in association with a session identifier and sends the session identifier to the user device. The service receives a later request from the user device to continue the registration process. The later request includes the session identifier and a digital signature created using the private key of the key pair. The service authenticates the digital signature based on the public key which is retrieved based on the session identifier. In response to authenticating the digital signature, the service sends the registration data associated with the request to the user device and registers the user device based on the registration data.

20 Claims, 9 Drawing Sheets

200

RECEIVING REQUEST FROM USER DEVICE TO BEGIN PROCESS TO REGISTER USER DEVICE WITH A SERVICE, INC. REGISTRATION DATA AND PUBLIC KEY    201

STORE PUBLIC KEY WITH SESSION IDENTIFIER AND SEND SESSION IDENTIFIER TO USER DEVICE    203

RECEIVE LATER REQUEST TO CONTINUE REGISTRATION PROCESS FROM USER DEVICE, INC. SESSION IDENTIFIER AND DIGITAL SIGNATURE    205

AUTHENTICATE DIGITAL SIGNATURE BASED ON PUBLIC KEY    207

SEND REGISTRATION DATA TO USER DEVICE    209

REGISTER USER DEVICE WITH THE SERVICE BASED ON REGISTRATION DATA    211

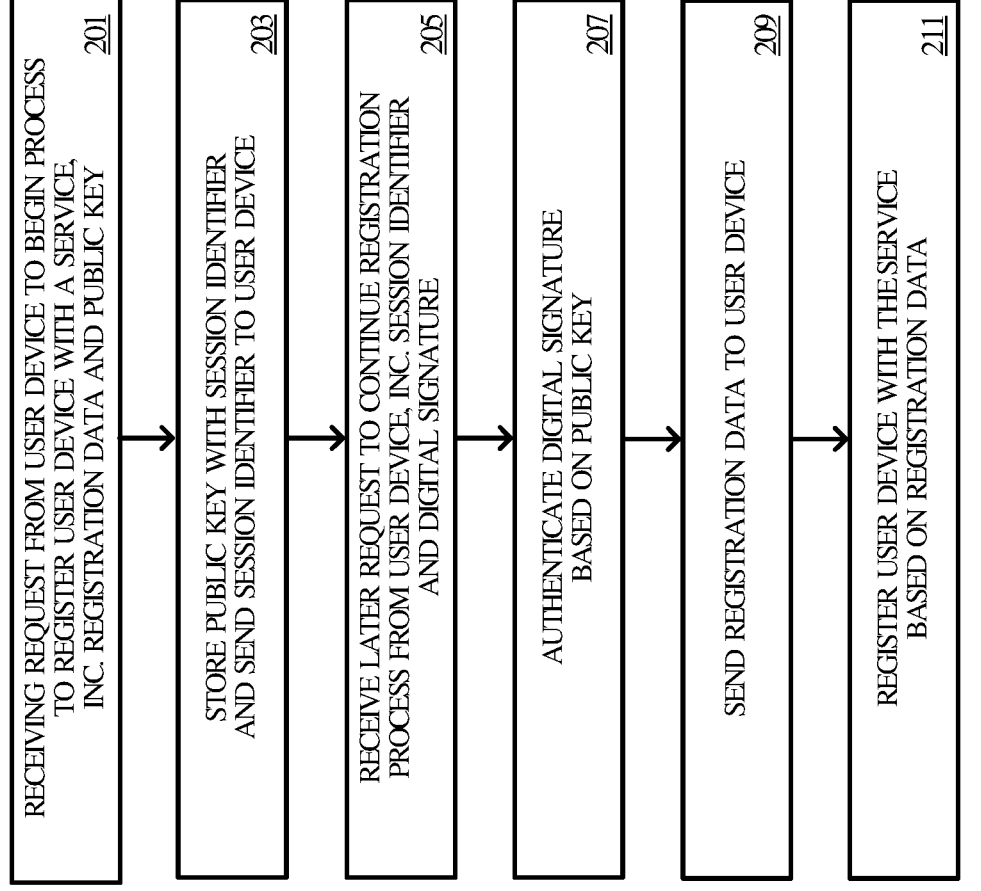

RECEIVING REQUEST FROM USER DEVICE TO BEGIN PROCESS TO REGISTER USER DEVICE WITH A SERVICE, INC. REGISTRATION DATA AND PUBLIC KEY — 201

STORE PUBLIC KEY WITH SESSION IDENTIFIER AND SEND SESSION IDENTIFIER TO USER DEVICE — 203

RECEIVE LATER REQUEST TO CONTINUE REGISTRATION PROCESS FROM USER DEVICE, INC. SESSION IDENTIFIER AND DIGITAL SIGNATURE — 205

AUTHENTICATE DIGITAL SIGNATURE BASED ON PUBLIC KEY — 207

SEND REGISTRATION DATA TO USER DEVICE — 209

REGISTER USER DEVICE WITH THE SERVICE BASED ON REGISTRATION DATA — 211

200

FIGURE 2

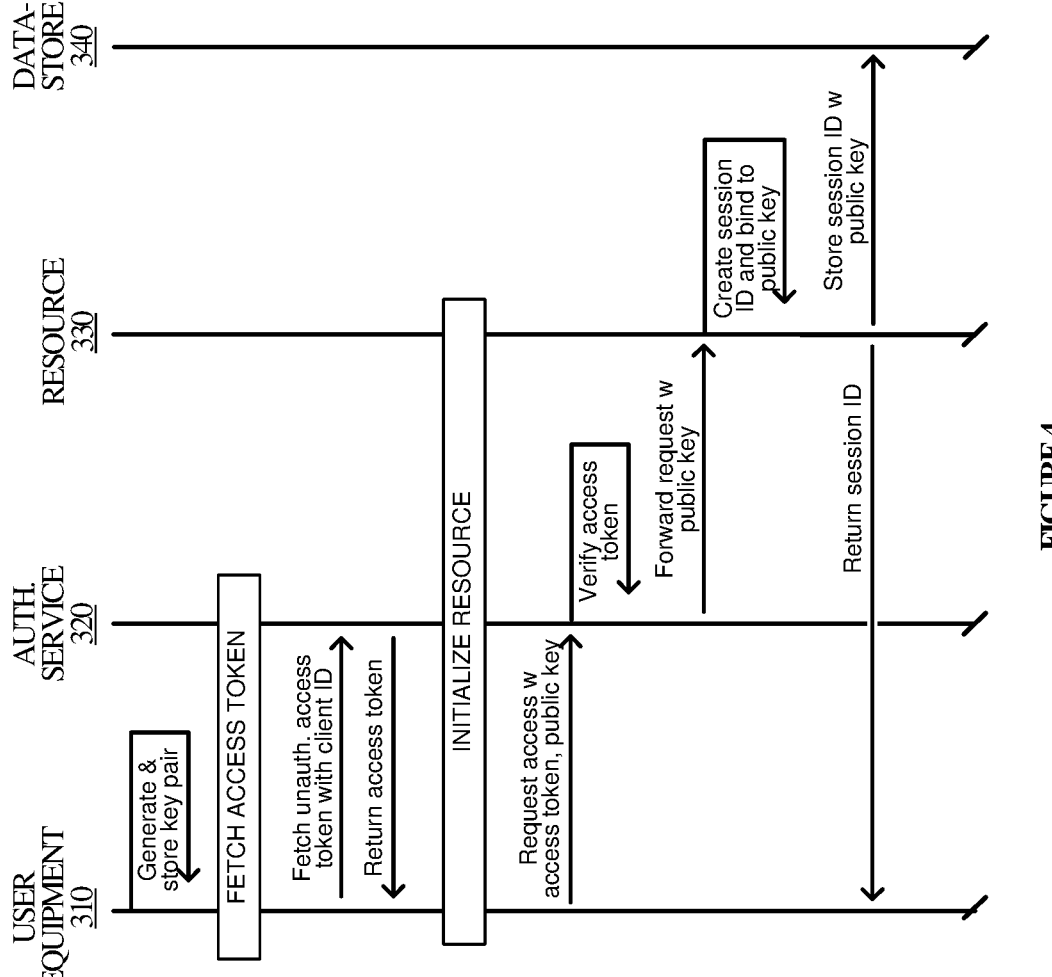
FIGURE 4

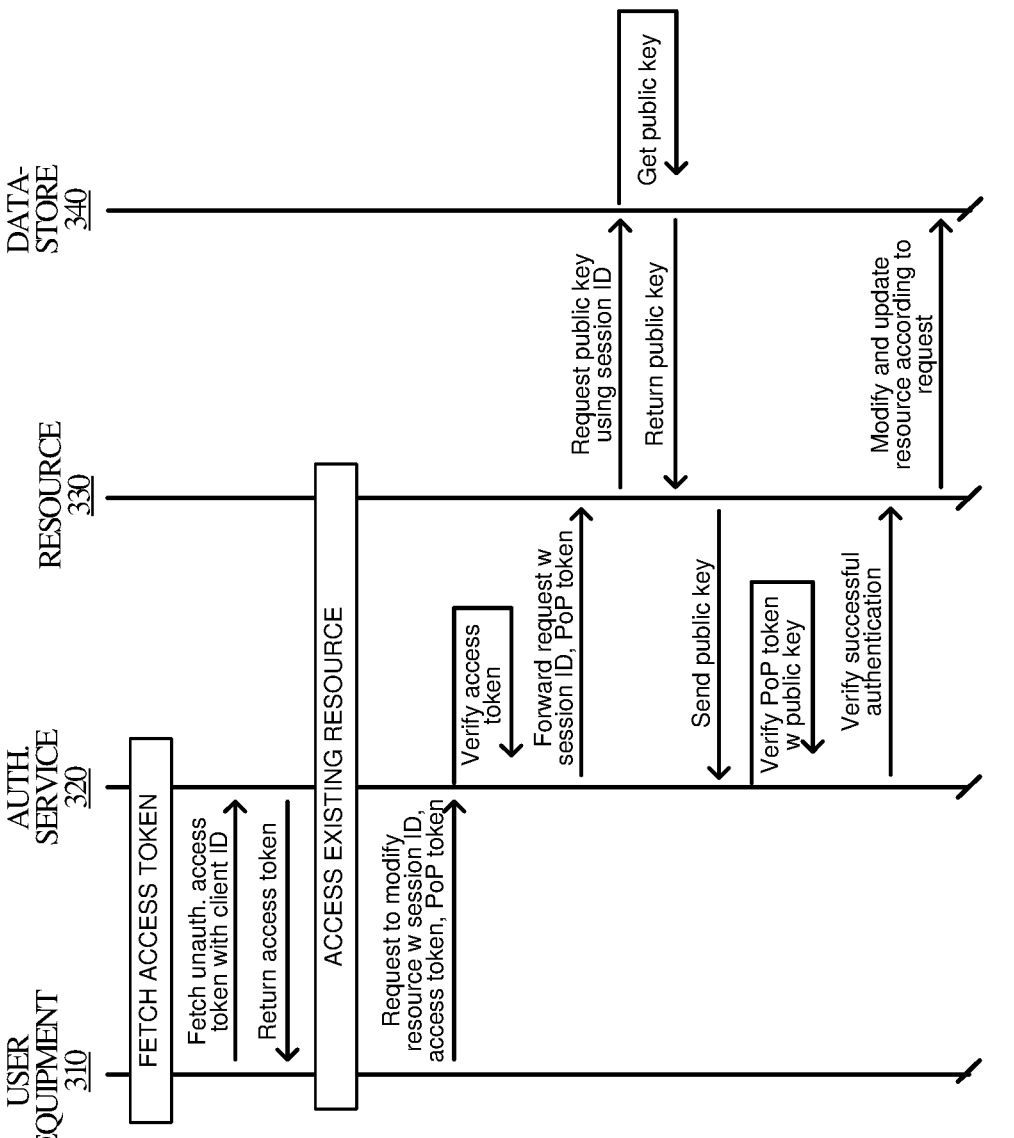
FIGURE 5

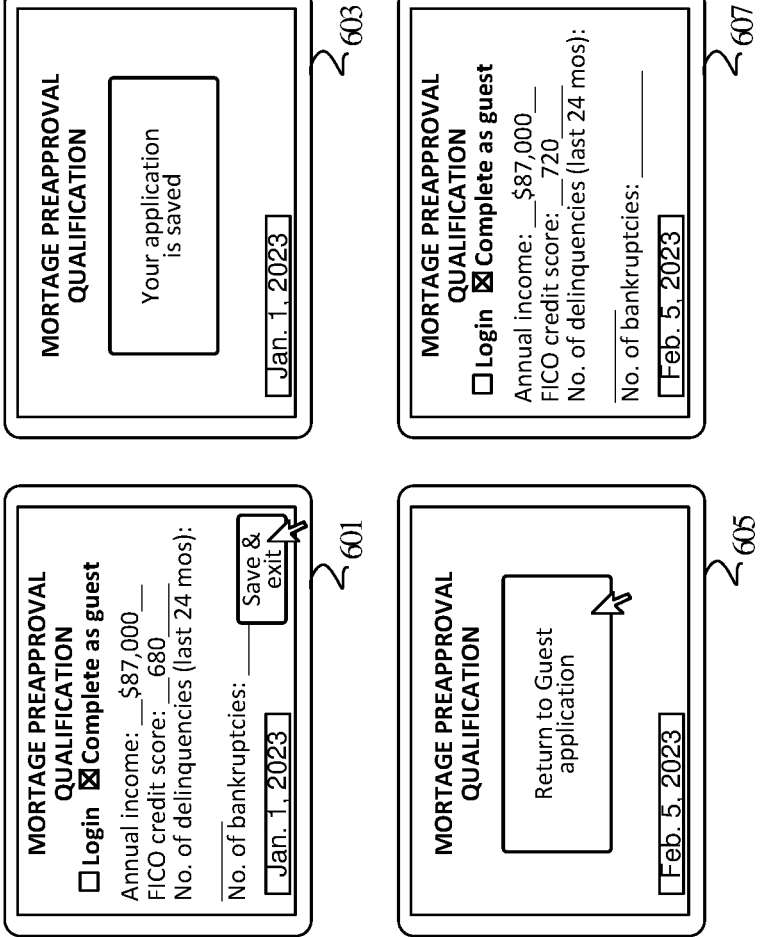
FIGURE 6

700

COMPUTING SYSTEM 901

STORAGE SYSTEM 903

SOFTWARE 905

DEVICE REGISTRATION PROCESS 906

COMM. I/F SYSTEM 907

PROCESSING SYSTEM 902

USER I/F SYSTEM 909

900

SECURE PROCESS FOR DEVICE REGISTRATION WITH A SERVICE

TECHNICAL FIELD

Aspects of the disclosure are related to the field of network security and in particular to device access to and registration with a network service.

BACKGROUND

In the intense competition among wireless network service providers for wireless customers, some service providers will offer prospective customers the opportunity to "test drive" their network services. To enable a subscriber of a competing network the ability to access and use its own network on a trial basis, a network service provider can provide the prospective customer with a virtual Subscriber Identity Module (SIM) which allows the customer's device to access the network without having a physical SIM card associated with the network. To access and use a service provider's wireless network on a trial basis, the prospective customer downloads the service provider's mobile application and initiates a registration process. When the customer completes the registration process, his or her mobile phone is configured to use a virtual SIM for the wireless network.

In some situations, a prospective customer may begin the registration process to subscribe to a wireless network but does not immediately complete it. The customer may pause the process of completing the registration for days or even weeks. If the customer has to reenter registration data when he or she resumes the registration process, the service provider is at risk of losing engagement with the customer. To facilitate resumption of the registration process, the mobile application of the wireless network may cache data entered by the customer in a cookie on the user's device, so that when the customer returns to complete the registration, the customer can continue the registration where he or she left off without having to restart the entire process.

However, caching user data on the client side, such as using cookies to store sensitive user data, is only as secure as the client device, and the service provider must have access to data storage on the user device to cache the data. Alternatively, the resource may cache user-specific data on the server side using, for example, an OAuth access token and store an encrypted key for the token on the client side. While access tokens can secure access to session data, they have a limited life. Once a token expires, access to the session data is lost and the customer's registration process must start anew.

TECHNICAL OVERVIEW

Technology is disclosed herein for registering a user device with a service. In an implementation, a service receives a request to begin a registration process from a user device. The request to register the user device with the service includes registration data and the public key of an asymmetric key pair. The service stores the public key in association with a session identifier and sends the session identifier to the user device. The service receives a later request from the user device to continue the registration process. The later request includes the session identifier and a digital signature created using the private key of the asymmetric key pair. The service authenticates the digital signature based on the public key which is retrieved based on the session identifier. In response to authenticating the digital signature, the service sends the registration data associated with the request to the user device and registers the user device based on the registration data.

In some implementations, the service includes an authentication service which receives the later request. The service sends the public key to the authentication service. The authentication service authenticates the digital signature based on the public key, and the service receives an indication of authentication to the service.

In some implementations, the request to begin the registration process and the later request to continue the registration process are received from a client device executing on the user device. In some implementations, the service receives the later request more than twenty-four hours after the request.

In the same or other implementations, the service directs the user device to generate the asymmetric key pair in association with the service.

BRIEF DESCRIPTION OF THE DRAWINGS

FIG. 2 illustrates a method of registering a user device with a service in an implementation.

FIG. 4 illustrates an operational scenario of registering a user device with a service in an implementation.

FIG. 5 illustrates an operational scenario of registering a user device with a service in an implementation.

FIG. 6 illustrates an exemplary operation of a client application of a service in an implementation.

DETAILED DESCRIPTION

Figure 1:
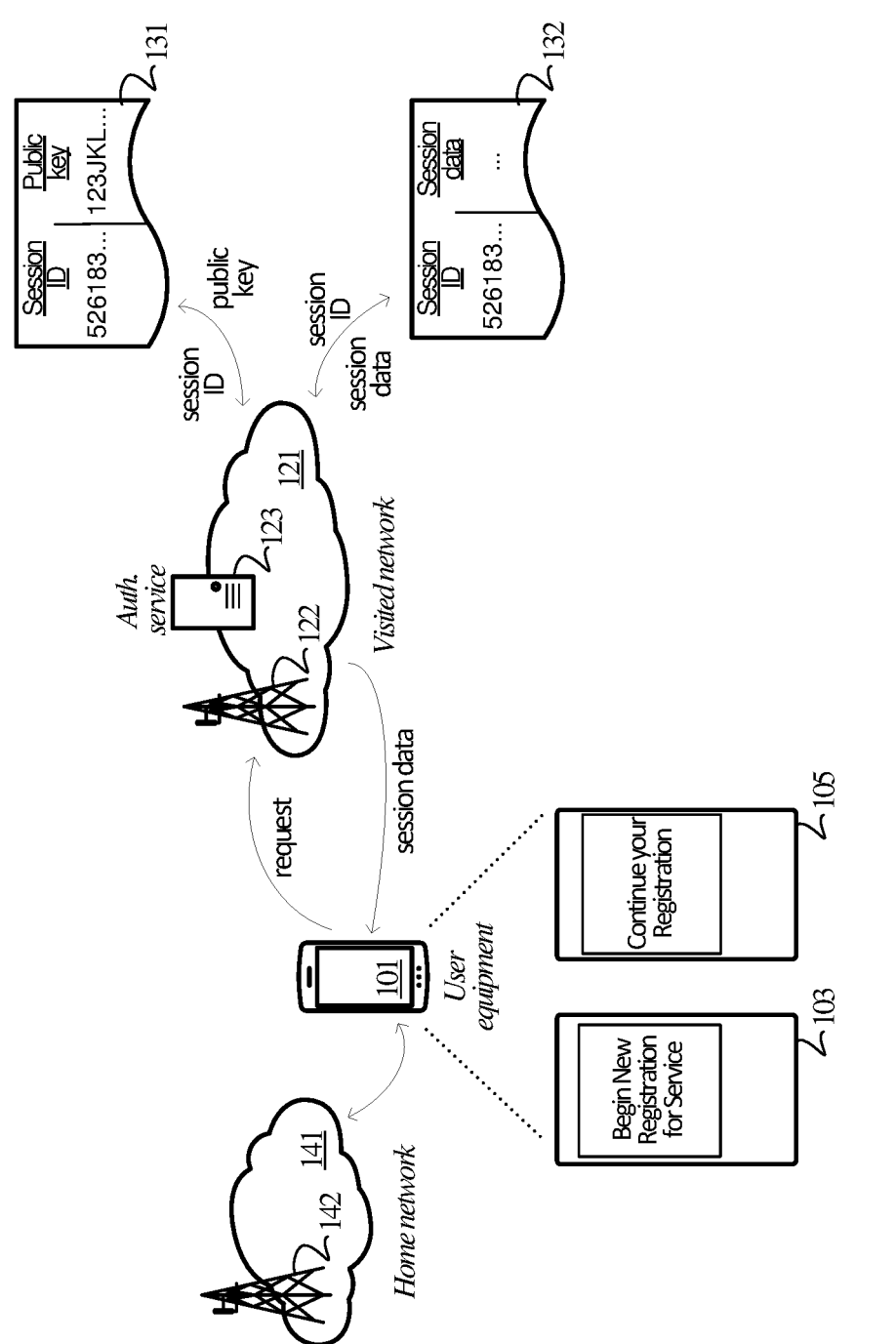
FIG. 1 illustrates an operational environment for registering a user device with a network service in an implementation.

Systems, methods, and devices are disclosed herein for registering a user device with service. In an implementation, a service receives a request to begin a registration process from a user device. The request to begin a process of registering the device with the service includes registration data and a public key of an asymmetric key pair. The service stores the public key in association with a session identifier and sends the session identifier to the user device. After initiating the registration process, the user may pause the registration process, for example, intending to complete it later. Later, the service receives a request to continue the registration process. The later request includes the session identifier and a digital signature created using the private key of the asymmetric key pair. The service authenticates the digital signature of the request based on the public key which the service retrieves from data storage based on the session identifier. With the digital signature authenticated, the service sends the registration data associated with the earlier request to the user device and registers the user device with the service based on the registration data.

In some implementations, the user device is a computing device which is anonymous with respect to a service or for which access to the service is not authorized. For example, a user device, such as a smartphone or other mobile computing device, may request access to a wireless communication network on a trial basis. Lacking a verifiable identity or login credentials (e.g., username and password) to access the network, the user device initiates a registration process with the network as a guest. In other scenarios, a user device, such as a laptop or desktop computer, may request to register with an online service, such as a shopping website. The user device begins the registration process anonymously, that is, without having established a verifiable identity with the website and without having established login credentials for access to the website. In other implementations, a user device which is authorized by or has a verified identity with the service may engage in a registration process with the service, as discussed infra.

In an implementation, the user device sends a request to initiate the process of registering the device with the service. The request can include registration data, such as user data or device data, along with a public key of an asymmetric encryption key pair. The request may be submitted by a user making appropriate selections in the user interface of a client application executing on the user device which is in communication with the service. Upon receiving the request, the service generates a unique session identifier and stores the public key in association with the session identifier in a datastore. The service may also store the registration data in association with the session identifier in the same or another datastore.

Subsequent to the initial request to register the device, the user device may halt or otherwise become disengaged with the registration process. For example, if the user operating the user device is unable to continue the registration process, the user may close the client application with the intention of resuming the process at a later time. When the user is ready to resume the registration process, the user reopens the client application on the user device and provides user input to request to continue the registration process. The user device sends the request to continue the registration process, including the session identifier and a digital signature, to the service.

Upon receiving the request to continue the registration process, the service retrieves the previously stored public key from the datastore according to the session identifier. The service may also retrieve any registration data supplied at the time of the initial request and send the registration data to the user device for use in the resumption of the registration process. As the user device continues the registration process, the user device may send new or updated registration data to the service which stores the new or updated registration data in association with the session identifier. Registration data received during the registration process can include user data, device data, subscription data, service level data, payment data, and so on. Registration data can also include personally identifiable information (PII), financial information such as credit card information, or other sensitive or confidential information.

The registration may be resumed multiple times after the registration process is begun. To continue the registration process, the user device sends a request to continue the registration process, including the session identifier and a digital signature, to the service. While the session identifier is the same in each request to ensure continuity of the registration process, the digital signature may be newly created based on the private key with each request to continue. The requests to begin and/or to continue the registration process may be hours, days, weeks, or months apart, or longer. In some scenarios, the duration of the entire registration process may be determined according to a policy of the service regarding registration of guest or anonymous devices. With each request to continue, the service may retrieve the registration data from a datastore where it is stored in association with the session identifier and send the registration data to the user device for display in the client application. The service may also receive and store new and updated registration data each time the user device continues the registration process. Upon completion of the registration process, the service may register the user device based on the registration data. To register the device, the service may authorize the user device to access the service. For example, the service may store credentials by which the user device can log into or otherwise access the service, or the service may store data relating to the verified identity of the user device.

In some implementations, the service or the client application of the service causes the user device to generate the asymmetric encryption key pair which is associated with the service. The user device stores the private key of the key pair in secure key storage onboard the device and sends the public key to the service. In requests to continue the registration process, the user device configures each request to include the session identifier and signs the request with a digital signature generated by the user device based on the private key. The requests may also include registration data. Upon receiving a request to continue the registration process, the service authenticates the digital signature using the public key associated with the session identifier, and the registration process continues. In some implementations, the digital signature is a Proof of Possession (PoP) token generated by the user device based on the private key of the asymmetric key pair.

The service creates and stores a unique session identifier in association with the public key. The session identifier may be a randomly generated sequence of characters by which the service can find and retrieve the public key. The session identifier may also be an identifier selected by the user and unique to the user, such as an email address or password, to mitigate the risk of losing the session identifier. The registration data associated with the user device (or the user) is secure even if the session identifier were to fall into the wrong hands because any malicious requests to retrieve the registration data would fail without the digital signature.

In some implementations, the service includes an authentication service which receives requests to continue the registration process for the service. To authenticate the request, the authentication service receives the public key from the service or from the datastore and the authenticates the digital signature of the request using the public key. Upon authenticating the digital signature, the authentication service forwards an indication of authentication (i.e., that the digital signature of the request has been authenticated) to the service.

In still other scenarios, the user or user device may be authorized to access to the service or may have a verified identity with the service, and the registration process may be a process, application, list (e.g., shopping list, wedding registry, "wish" list, etc.), or survey which is available to known or verified users or user devices or to users or user devices regardless of any prior verification or authorization by the service. For example, the registration process may include an application process by which a consumer can apply for a higher credit limit at the website of his or her credit card provider or by which a cellular network subscriber can apply to upgrade the user's subscription level. In still other scenarios, the registration process can include surveys by which a network endpoint obtains information from its customers regarding its service. Registration data received during the registration process is stored for each user device by the service in association with a unique session identifier, and a user device may continue the registration process over the course of multiple registration sessions. With each request to continue the registration process, the user device submits the session identifier and a digital signature based on a private encryption key associated with the service. The registration data provided by the user device during the registration process may be securely stored and retrieved by the service without the use of cookies or other less secure storage or time-constrained means.

Turning now to the Figures, FIG. 1 illustrates operational environment 100 for operating a wireless network in an implementation. Operational environment 100 includes user equipment (UE) 101 in communication with home network 141. Home network 141 includes radio access node (RAN) 142 by which UE 101 connects with home network 141. Operational environment 100 also includes visited network 121, which includes RAN 122 and authentication service 123. Visited network 121 includes or is operatively or communicatively coupled to databases 131 and 132. UE 101 includes a display screen with, at various times, views 103 and 105.

UE 101 is representative of smartphones, computers, sensors, controllers, and/or other user apparatus with processing circuitry for wireless communication, such as 5G-enabled smartphones and other computing devices. UE 101 is capable of communicating with RANs 122 and 142 over radio frequency bands.

RAN 122 is representative of equipment using radio frequencies to provide wireless connectivity to UE 101, such as Fifth Generation (5G) RANs, long-term evolution (LTE) RANs, geodes, eNodeBs, NB-IoT access nodes, LP-WAN base stations, wireless relays, Wifi hotspots, ENET access nodes, Bluetooth access nodes, and/or other wireless or wireline network transceivers. UE 101 and RAN 122 are also representative of wireless communication devices or radios which wirelessly communicate using protocols such as Fifth Generation New Radio (5GNR), 5G Advanced, LTE, Institute of Electrical and Electronic Engineers (IEEE) 902.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA).

Visited network 121 is representative of a wireless network, such as a wireless communication network capable of using a Fifth Generation New Radio (5GNR) protocol to communicate with UE 101 via RAN 122. In an implementation, visited network 121 is representative of a service-based architecture (SBA) which includes network functions and elements which constitute the control plane and user plane of a wireless communication network. Network elements of the SBA can include UDMs, AMFs, SMFs, PCFs, AUSFs, IWFs, and UPFs, as well as other network functions or virtual network functions. The network elements are implemented on one or more suitable computing devices, of which computing device 1100 of FIG. 11 is representative. Examples of suitable computing devices include server computers, blade servers, and the like. The network elements of visited network 121 may be implemented in the context of one or more data centers, of which network data center 1000 of FIG. 10 is representative, in a co-located or distributed manner, or in some other arrangement.

In operation, UE 101 is a subscriber to home network 141 but requests access to visited network 121. UE 101 is anonymous with respect to visited network 121 such that UE 101 is not a subscriber to visited network 121, nor does it have a verified identity with or access authorization for visited network 121. In an implementation, UE 101 submits to visited network 121, via authentication service 123, a request to begin the process of registering with visited network 121. In an implementation, UE 101 may submit the initial request via a client application, such as a web application, executing on UE 101. In its initial request to register with visited network 121, UE 101 submits a public key of an encryption key pair generated in association with the request to access visited network 121. Visited network 121 creates a unique session identifier and stores the public key in association with the session identifier in database 131. Visited network 121 stores registration data received in association with or at the time of the initial request, including any user data received from UE 101 via the client application, in association with the session identifier in database 132.

In an implementation, in a later request to continue the process of registering with visited network 121, UE 101 sends to visited network 121, via authentication service 123, a digitally signed request which includes the session identifier. Upon receiving the later request, visited network 121 retrieves from database 131 the public key stored in association with the session identifier and sends the public key to authentication service 123. Authentication service 123 authenticates the digital signature of the later request using the public key and, with the request verified, the process of registering UE 101 with the service continues. Visited network 121 may retrieve registration data stored in association with the session identifier from database 132 and send the registration data to UE 101 for display in the client application. Visited network 121 receives and stores any new or updated registration data in database 132 in association with the session identifier. For example, UE 101 may submit new registration data or changes to already submitted registration data in later requests to continue the registration process.

In an exemplary scenario, UE 101 seeks to register with visited network 121 via a client application executing on UE 101. Visited network 121 may provide anonymous users, e.g., guest or other unauthorized users, with the ability to register with visited network 121 over a period of several days, weeks, or even months so that the user can complete the registration process in several sessions. A display screen on UE 101 displays view 103 inviting users to begin the process of registering with visited network 121. Subsequent to UE 101 initiating the registration process, the client application displays view 105 indicating that the 28 days remain in UE 101's registration period.

In some implementations, visited network 121 may provide UE 101 with services or a limited menu of services during the registration period. For example, visited network 121 may extend to user devices such as UE 101 the ability to access visited network 121 during the registration process, such that the registration period serves as a trial period during which a prospective customer can compare the Quality of Service (QoS) offered by visited network 121 with the QoS of home network 141.

A technical effect of the disclosed technology is that UE 101 can repeatedly return to continue the process of registering with visited network 121 until the registration process is complete. Registration data, such as sensitive user data provided during the registration process, is stored in association with the session identifier for retrieval each time the registration process is resumed. The integrity of the registration data is protected by using digitally signed requests which are authenticated by authentication service 123 of visited network 121. So, for example, UE 101 may provide user data, such as personally identifiable information (PII) or sensitive financial information, and retrieve the user data in later registration sessions, which may be several days, weeks, or months apart, without creating a user account, credentials, verifiable identity, and so on with visited network 121. In other scenarios of the disclosed technology, a user completing a lengthy and detailed online form on, say, a consumer lending website can complete the form in several registration sessions over a period of weeks or months without creating a login or user account. Moreover, the user can submit sensitive information, and as the user submits user data, visited network 121 updates the registration data stored in association with the session identifier. Thus, the user data is stored securely by visiting network 121 and can be retrieved for use or modification by the user over multiple registration sessions without the need to resubmit the data and without the risk of losing information already submitted. The length of time for which the public key, the session identifier, and registration data is persisted by visited network 121 in databases 131 or 132 is controlled by visited network 121, which may establish a policy regarding the maximum duration of registration period (e.g., 90 days).

FIG. 2 illustrates process 200 to register a user device with a service, such as an e-commerce website or wireless network service which a user wishes to access on a trial basis. Process 200 executes on one or more computing devices, such as server computers or computers in the context of a network data center, according to program instructions which direct the computing devices to function as follows, referring parenthetically to the steps in FIG. 2 and in the singular for the sake of clarity.

In an implementation, a user device sends a request to a service to begin the process to register the device with the service (step 201). The request includes registration data and a public key of an asymmetric encryption key pair. In various implementations, the service prompts the user device to generate the encryption key pair, including a private key and a public key generated from the private key, and to submit the public key with the request. Registration data can include user data or device data, such as a device identifier or IP address, or data relating to the service, such as a subscription level. The user device is a computing device, such as smartphone or tablet computer, or a laptop or desktop computer.

In some implementations, the service receives the request to begin the registration process via a client application executing on the user device. For example, the service may be a wireless network which is a competitor of the user device's home network, and the competitor may wish to provide network services to the user device on a trial basis so the user can compare services of the networks. The user may submit the request to access the visited network via a web application in a browser application executing on the user device. The user device may be anonymous with respect to the service (e.g., the user device is not, at the time of the request, a subscriber to the service) or, in some scenarios, the device may be authorized for access to the service.

Upon receiving the request to initiate the registration process, the service stores the public key in association with a session identifier (step 203). The session identifier is unique to the user device and can include a randomly generated series of characters by which the service can retrieve the public key. The session identifier may be a unique identifier provided by a user in the interface of the client application, such as an email address. The service stores the session identifier with the public key in a database or datastore. The service sends the session identifier to the user device.

In some implementations, the service also stores registration data received with the initial request in association with the session identifier. For example, a user operating the user device may submit information in an online form associated with requesting to begin the registration process. Alternatively, the service may collect device information, such as a device or IP address, when the initial request is made. In some implementations, registration data may be stored in a second database in association with the session identifier.

Next, the service receives a later request from the user device to continue the registration process (step 205). The later request includes the session identifier and a digital signature generated by the user device based on the private key of the encryption key pair. The service retrieves the public key stored in association with the session identifier to authenticate the digital signature of the request.

Upon retrieving the public key stored in association with the session identifier, the visited network authenticates the request for access based on the digital signature of the request and the public key (step 207). In an implementation, the user submits the digitally signed later request to an authentication service of the service. The service transmits the public key to the authentication service which authenticates the digital signature of the later request using the public key and transmits an indication of authentication to the service. With the later request authenticated, the process of registering the user device with the service is resumed.

Having authenticated the request to continue the registration process, the service sends the registration data stored in association with the session identifier to the user device (step 209). In some implementations, the service may retrieve registration data, such as user data or device data, collected during the initial request to register the user device or during subsequent requests to continue the registration process. The service may send registration data to the client application executing on the user device for display where the user can view, add to, or modify the data as appropriate. When the service receives new or updated registration data during the registration process, the new or updated registration data may be stored in association with the session identifier for later registration sessions or for registering the user device with the service when the registration process is complete.

When the registration process is complete, the service may register the user device based on the registration data (step 211). Registering the device can include authorizing the user device to access the service or parts of the service. Registering the device can include creating a user account and storing the registration data in association with the user account. Registering the device can also include creating login credentials (e.g., username and password) by which the user device can access the service.

Referring again to FIG. 1, elements of operational environment 100 illustrate a brief example of process 200. In operation, UE 101 makes an initial request to register with visited network 121 via a client application of visited network 121 which is executing on UE 101. UE 101 is directed by visiting network 121, through the client application, to generate an asymmetric encryption key pair and to submit the public key of the key pair when UE 101 submits the initial request to register with visited network 121. Visited network 121 stores the public key in database 131 in association with a session identifier unique to UE 101 or unique to the registration process of UE 101 that is underway. Visited network 121 transmits the session identifier to UE 101. In later requests to continue the registration process after the initial request, UE 101 submits the session identifier which allows visited network 121 to retrieve the public key to authenticate the later requests and to retrieve registration data stored by visited network 121 during the registration process.

In the process of registering with visited network 121, UE 101 may submit, via the client application, various types of data by which visited network 121 will determine whether or in what fashion UE 101 may register for access to visited network 121. Registration data may be submitted by the user of UE 101 via the user interface of the client application, or the client application may obtain, for example, device data from the device directly. Registration data can include information relating to the user such as the user's identity and geographic location, device data such as device type, capability (e.g., 5G capability), identifier (e.g., IMEI), IP address, and so on. Registration data may also include information relating any current subscriptions of UE 101, such UE 101's current service provider, level of service, and plan renewal date. Visited network 121 stores registration data collected from UE 101 in database 132 in association with the session identifier. Thus, the user operating UE 101 can submit information to visited network 121 in piecemeal fashion rather than all at once, and the information provided in earlier sessions of the registration process will be stored by visited network 121 in database 132 for later retrieval as the registration process continues.

In an exemplary scenario, UE 101 halts or otherwise becomes disengaged from the registration process. For example, the user may exit the client application in the midst of entering data for the registration process. To resume the registration process, the client application is reopened on UE 101, and UE 101 sends a request to continue the registration process with visited network 121. The request to continue the registration process sent by UE 101 is received by authentication service 123 of visited network 121. The request is digitally signed by UE 101 using a digital signature generated from the private key of the encryption key pair and includes the session identifier. Authentication service 123 obtains the public key stored in database 131 in association with the session identifier from visited network 121. Authentication service 123 uses the public key to authenticate the request by authenticating the digital signature of the request. Authentication service 123 provides an indication of authentication to visited network 121 which then allows UE 101 to resume the registration process.

Figures 3A, 3B:
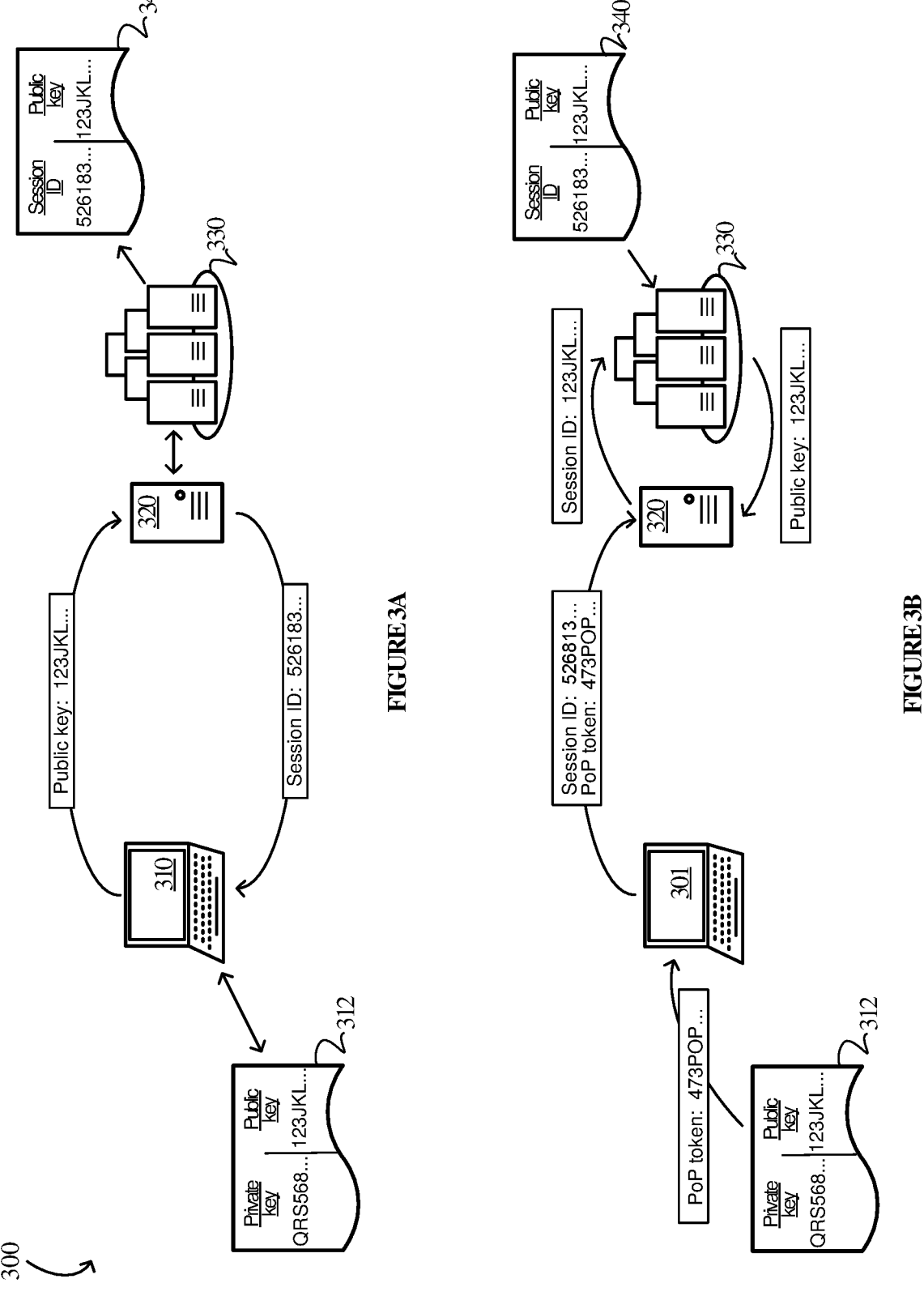
FIGS. 3A and 3B illustrate an operational scenario of registering a user device with a service in an implementation.

Turning now to FIGS. 3A and 3B, operational environment 300 illustrates a process by which a user device registers with a service, such as a network resource, in an implementation. In FIG. 3A, UE 310, representative of a laptop or desktop computer or mobile computing device, sends a request to resource 330 to begin a process of registering UE 310 with resource 330. Resource 330 is representative of a data network or wireless communication network or an endpoint of an end-to-end network communication path originating from UE 310. For example, resource 330 can include a service executing on a network server (e.g., a shopping website, consumer lending website, banking website, etc.). Resource 330 includes authentication service 320 and datastore 340. Datastore 340 is representative of secure data storage of or operatively coupled to resource 330.

UE 310 makes an initial request to register with resource 330. For example, UE 310 submits a request to begin a process of registration with resource 330 via a client application of resource 330 executing on UE 310. Resource 330 prompts UE 310 to generate an encryption key pair with a private key ("QRS568 . . . ") and a public key ("123JKL . . . ") and to send the public key to resource 330. UE 310 generates the asymmetric encryption key pair and stores the key pair in secure key storage 312 onboard UE 310. UE 310 transmits the public key ("123JKL . . . ") of the key pair to resource 330. Resource 330 generates a unique session identifier ("526183 . . . ") and stores the public key in association with the session identifier in datastore 322. Resource 330 returns the session identifier to UE 310.

In FIG. 3B, UE 301 makes a subsequent request to return to and continue the registration process with resource 330. In its subsequent request, UE 301 sends to resource 330, via authentication server 320, the session identifier. The request is digitally signed with a PoP token ("473POP . . . ") generated based on the private key of the encryption key pair. Upon receiving the subsequent request, resource 330 retrieves the public key associated with the session identifier from datastore 340 and provides the public key to authentication service 320. Authentication service 320 verifies the PoP token of the request and provides an indication of authentication to resource 330. With the PoP token verified, authentication service 320 establishes a new registration session for UE 310 with resource 330. Resource 330 provides session data that was collected from UE 310 during the initial request to register and during subsequent request to continue registering to UE 310.

FIG. 4 illustrates operational scenario 400 for registering a user device with a network resource in an implementation, referring to elements of FIGS. 3A and 3B. In operational scenario 400, UE 310, executing a client application to resource 330, generates an encryption key pair in association with resource 330. UE 310, via the client application, requests an access token for access to resource 330 from authentication service 320. The request includes a client identifier associated with the client application. The request for access is received by authentication service 320. Authentication service 320 transmits an access token to UE 310.

Next, UE 310 sends a request to begin a registration process of registering UE 310 with resource 330 to authentication service 320. The request includes the access token and the public key of the encryption key pair. Upon receiving the request, authentication service 320 verifies the access token and forwards the initial request for access to resource 330, including the public key. Resource 330 generates a unique session identifier and binds it to the public key. Resource 330 stores the session identifier in association with the public key in datastore 340. Resource 330 sends the session identifier to UE 310.

Turning now to FIG. 5, operational scenario 500 continues operational scenario 400 for registering a user device with a network resource in an implementation. In operational scenario 500, UE 310 requests a new access token for access to resource 330 from authentication service 320. The request includes the client identifier associated with the client application executing on UE 310. The request for access is received by authentication service 320. Authentication service 320 transmits the new access token to UE 310.

Next, UE 310 sends a request to authentication service 320 to continue the registration process with resource 330. The request includes the new access token along with the session identifier and a PoP token generated based on the private key of the encryption key pair. Upon receiving the request, authentication service 320 verifies the access token and creates a new registration session with resource 330. Authentication service 320 forwards the request to continue the registration process, including the session identifier and the PoP token, to resource 330. Resource 330 obtains the public key stored in association with the session identifier from datastore 340 and sends the public key to authentication service 320. Authentication service 320 verifies the PoP token using the public key. Upon successfully authenticating the request, authentication service 320 sends an indication of authentication to resource 330. With the request authenticated, resource 330 receives and modifies registration data according to the request. For example, resource 330 sends stored registration data for display in the client application of UE 101, where the user can view, modify, add to, or delete the data as appropriate. The changes made to the registration data are propagated to the registration data in storage where it can be retrieved for later registrations sessions or when UE 101 is registered with resource 330.

FIG. 6 illustrates operational scenario 600 including exemplary views of a client application executing on a user device in an implementation. In operational scenario 600, a user device, of which UE 101 is representative, executes a client application which causes view 601 to be displayed on a display screen of the user device. The client application is in communication with a service or endpoint, such as an Internet-based consumer lending service, which receives information entered by a user in the client application and stores the information in association with a unique session identifier.

In view 601, a user is prompted to submit information in the user interface of an online mortgage preapproval application on Jan. 1, 2023. The user is presented with the option of completing the application without creating a user account or accessing an existing user account. The user device receives input in the user interface indicating the user wishes to save the entered data and exit the application. Upon the user clicking "Save & exit," the client application displays view 603 on the user device which indicates the information entered by the user in application has been saved.

In an implementation, the client application prompts the user device to create an encryption key pair in association with the online service which will allow the user to return to and continue completing the online application. For example, when the client application receives an indication that the session is to be exited, the client application causes the user device to create the encryption key pair and submit the user data in the online form along with the public key of the key pair to the online service. The online service, having received the user data and the public key, creates a unique session identifier and stores the public key and the user data in association with the session identifier in a datastore. The online service returns the session identifier to the client application which stores the session identifier in device storage. Notably, consumer lending applications typically require the entry of sensitive user data, such as PII and confidential financial data. In an implementation, the client application does not store sensitive user data onboard the user device. The client application may store the session identifier in a cookie, in a password storage application executing on the user device, or in other device storage. In some implementations, the client application may prompt the user to enter a password or passcode on which the session identifier is based or by which the session identifier can be retrieved.

Next, on Feb. 5, 2023, the client application is reopened on the user device. The client application displays view 605 which prompts the user to continue his or her Guest application. Upon receiving input indicating that the user wishes to continue the application process, the client application submits the session identifier in a request to continue the application process from the previous session. The request is digitally signed with a PoP token generated from the private key of the encryption key pair. The online service receives the request to continue and retrieves the public key of the key pair using the session identifier in the request. With the public key, the online service authenticates the request to confirm that the request comes from the same device as the one accessing the client application during the previous session, i.e., the session of Jan. 1, 2023. In an implementation, the online service relays the digitally signed request along with the public key to an authentication service which authenticates the request and sends an indication of authentication to the online service.

In view 607, with the February 5 request to continue the application process authenticated, the online service transmits the application data collected and stored in association with the session identifier to the client application for display. In view 607 of the client application, the user can add, modify, or delete the application data of the previous session. The client application transmits the new or updated user data to the service which stores the information in association with the session identifier. For example, the user may enter an updated credit score since the application process was initiated. In an implementation, user data transmitted between the user device and the service is encoded or encrypted to protect the integrity of the data.

Figure 7:
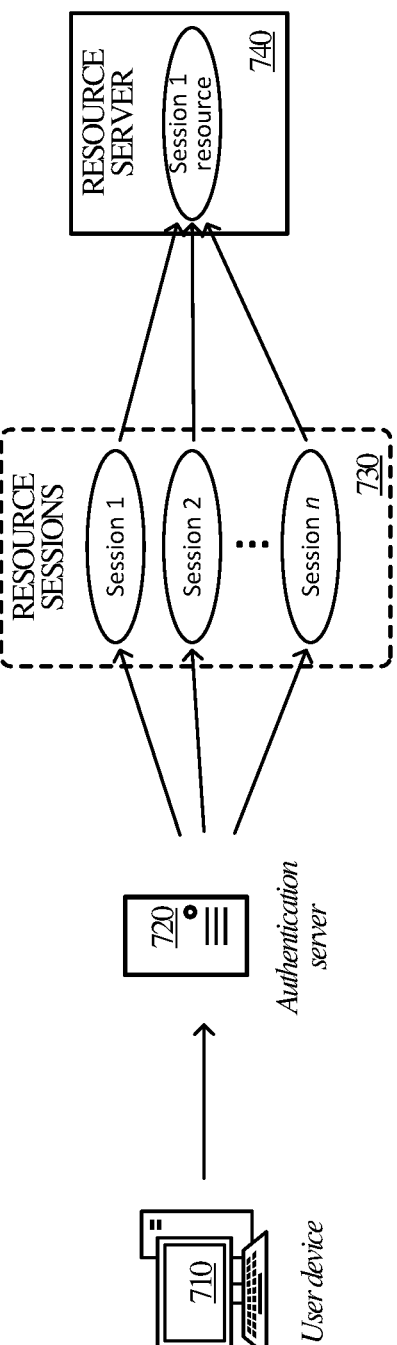
FIG. 7 illustrates an operational scenario of registering a user device with a network resource in an implementation.

FIG. 7 illustrates operational architecture 700 by which a user device can access, from a network service, data that was previously submitted to the network service in an implementation. In operational architecture 700, user device 710 makes multiple successive requests for access to resource server 740 via authentication server 720. For example, user device 710 may initiate a registration process and complete the process over the course of resource sessions 730. As each request to continue the process is made, authentication server 720 creates a new session ("Session 1," "Session 2," . . . "Session n") which associates user device 710 with resource server 740. Each request made by user device 710 is digitally signed according to a private key of an asymmetrical encryption key pair which was created at the time of the initial access to resource server 740, Session 1. The public key of the encryption key pair is supplied to resource server 740 by user device 710. Resource server 740 stores the public key in association with a unique session identifier which resource server 740 returns to user device 710. Session information collected by resource server 740 from user device 710 during Session 1 is stored in association with the session identifier.

In a later request for access to resource server 740, authentication server 720 creates a new session, e.g., Session 2, but by which user device 710 is able to access the data associated with Session 1. After Session 1, when the user requests access to Session 1 data from resource server 740, the request includes the session identifier for Session 1. With the session identifier provided by user device 710 in its later request, authentication server 720 obtains the public key stored by resource server 740 and uses the public key to authenticate the digital signature of the later request. Thus, a user using user device 710 can retrieve and work with data provided during Session 1 in later sessions. Any data provided during the initial or later sessions of resource sessions 730 are securely stored by resource server 740 in association with the session identifier rather than onboard user device 710.

Figure 8:
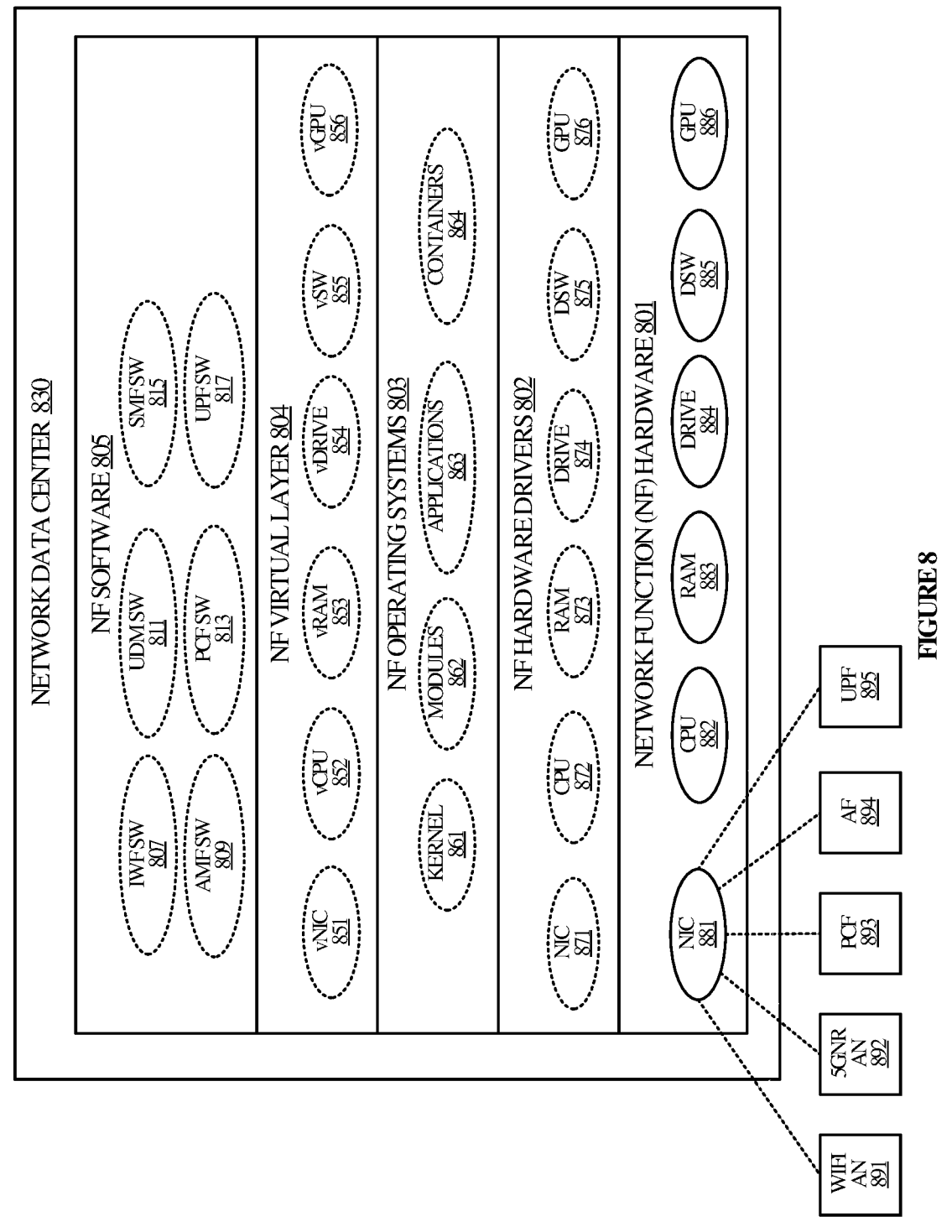
FIG. 8 illustrates a network data center architecture of wireless network in an implementation.

FIG. 8 illustrates exemplary network data center 830, a network core of a wireless communication system, of which visited network 121 of FIG. 1 is representative. Network data center 830 includes network function (NF) software 805, network function virtual layer 804, network function operating systems 803, network function hardware drivers 802, and network function hardware 801.

Network function software 805 of network data center 830 includes software for executing various network functions: IWF software 807, AMF software 809, UDM software 811, PCF software 813, SMF software 815, and UPF software 817. Other network function software, such as network repository function (NRF) software, are typically present but are omitted for clarity.

Network function virtual layer 804 includes virtualized components of network data center 830, such as virtual NIC 851, virtual CPU 852, virtual RAM 853, virtual drive 854, virtual software 855, and virtual GPU 856. Network operating systems 803 includes components for operating network data center 830, including kernels 861, modules 862, applications 863, and containers 864 for network function software execution. Network function hardware drivers 802 include software for operating network function hardware 801 of network data center 830, including network interface card (NIC) drivers 871 for NICs 881, CPU drivers 872 for CPUs 882, RAM drivers 873 for RAM 883, flash/disk drive drivers 874 for flash/disk drives 884, data switch (DSW) drivers 875 for data switches 885, and drivers 876 for GPUs 886. Of network function hardware 801 of network data center 830, network interface cards 881 include hardware components for communicating with Wifi access node 891, 5GNR access node 892, PCF 893, application server 894, and UPF 895.

Figure 9:
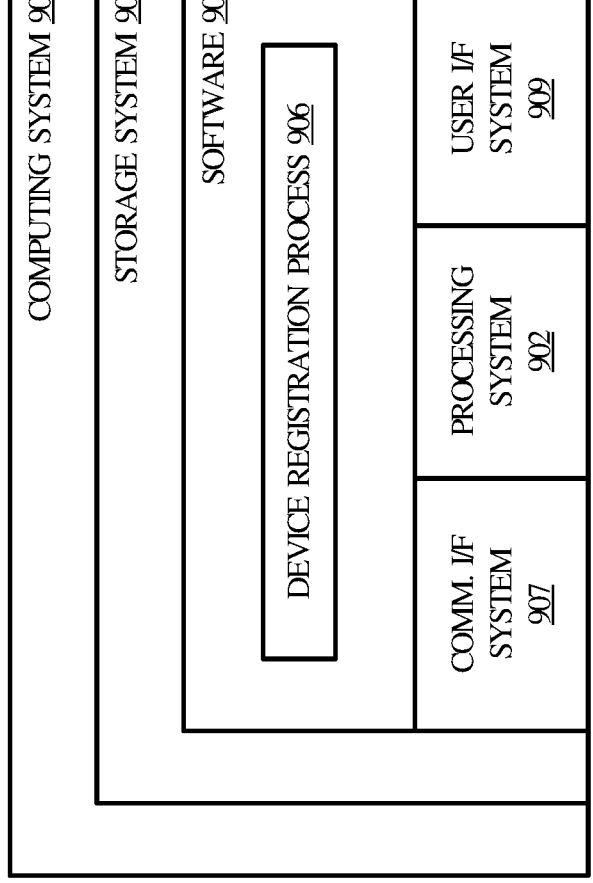
FIG. 9 illustrates a computing system suitable for implementing the various operational environments, architectures, processes, scenarios, and sequences discussed below with respect to the other Figures.

Turning now to FIG. 9, architecture 900 illustrates computing device 901 that is representative of any system or collection of systems in which the various processes, programs, services, and scenarios disclosed herein may be implemented. Examples of computing device 901 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements device registration process 906, which is representative of the device registration processes discussed with respect to the preceding Figures, such as process 200. When executed by processing system 902, software 905 directs processing system 902 to operate as described herein for at least the various processes, operational scenarios, and sequences discussed in the foregoing implementations. Computing device 901 may optionally include additional devices, features, or function not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including device registration process 906) may be implemented in program instructions and among other functions may, when executed by processing system 902, direct processing system 902 to operate as described with respect to the various operational scenarios, sequences, and processes illustrated herein. For example, software 905 may include program instructions for implementing the device registration processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to support device registration processes. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary, etc.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents. The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method of registering a user device with a service, the method comprising:

receiving, by the service, a request from the user device to begin a registration process to register the user device with the service, wherein the request includes registration data and a public key of an asymmetric key pair;

storing, by the service, the public key in association with a session identifier;

sending, by the service, the session identifier to the user device;

receiving, by the service, a later request from the user device to continue the registration process, wherein the later request includes the session identifier and a digital signature created using a private key of the asymmetric key pair;

authenticating, by the service, the digital signature of the later request based on the public key, wherein the public key is retrieved based on the session identifier;

responsive to authenticating the digital signature, sending, by the service, the registration data associated with the later request to the user device; and registering, by the service, the user device with the service based on the registration data.

2. The method of claim 1, wherein the service comprises an authentication service.

3. The method of claim 2, wherein:

receiving, by the service, the later request comprises receiving, by the authentication service, the later request; and authenticating, by the service, the digital signature of the later request comprises sending, by the service, the public key to the authentication service and receiving, by the service, an indication of authentication from the authentication service, wherein the authentication service authenticates the digital signature of the later request based on the public key.

4. The method of claim 3, wherein the request to begin the registration process and the later request to continue the registration process are received from a client application executing on the user device.

5. The method of claim 4, wherein receiving the later request comprises receiving the later request more than twenty-four hours after the request.

6. The method of claim 1, further comprising directing, by the service, the user device to generate the asymmetric key pair in association with the service.

7. The method of claim 1, wherein registering, by the service, the user device with the service comprises authorizing, by the service, the user device to access the service.

8. The method of claim 1, wherein the service comprises a 5G network service.

9. A computing apparatus comprising:

one or more computer-readable storage media;

one or more processors operatively coupled with the one or more computer-readable storage media; and program instructions stored on the one or more computer-readable storage media that, when executed by the one or more processors, direct the computing apparatus to:

receive, from a user device, a request to begin a registration process to register the user device with a service, wherein the request includes registration data and a public key of an asymmetric key pair;

store the public key in association with a session identifier;

send the session identifier to the user device;

receive, from the user device, a later request to continue the registration process, wherein the later request includes the session identifier and a digital signature created using a private key of the asymmetric key pair;

authenticate the digital signature of the later request based on the public key, wherein the public key is retrieved based on the session identifier;

send the registration data associated with the later request to the user device; and register the user device with the service based on the registration data.

10. The computing apparatus of claim 9, wherein to authenticate the digital signature, the program instructions direct the computing apparatus to:

send the public key to an authentication service of the service; and receive an indication of authentication from the authentication service, wherein the authentication service authenticates the digital signature of the later request based on the public key.

11. The computing apparatus of claim 10, wherein the request and the later request are received from a client application executing on the user device.

12. The computing apparatus of claim 11, wherein receiving the later request to continue the registration process comprises receiving the later request more than twenty-four hours after the request to begin a registration process.

13. The computing apparatus of claim 9, wherein the program instructions further direct the computing apparatus to direct the user device to generate the asymmetric key pair in association with the service.

14. The computing apparatus of claim 9, wherein to register the user device with the service, the program instructions direct the computing apparatus to authorize the user device to access the service.

15. A method of registering a user device with a service, the method comprising:

sending, by the user device, a request to the service to begin a registration process to register the user device with the service, wherein the request includes registration data and a public key of an asymmetric key pair;

receiving, by the user device, a session identifier from the service;

sending, by the user device, a later request to the service to continue the registration process, wherein the later request includes the session identifier and a digital signature created using a private key of the asymmetric key pair; and receiving, by the user device, registration data associated with the later request from the service.

16. The method of claim 15, further comprising:

executing, by the user device, a client application on the user device; and receiving, by the user device, user input indicative of the request to begin the registration process and the later request to continue the registration process.

17. The method of claim 16, further comprising generating, by the user device, the asymmetric key pair in association with the service.

18. The method of claim 17, wherein sending, by the user device, the later request to continue the registration process comprises sending, by the user device, the later request more than twenty-four hours after sending the request to begin the registration process.

19. The method of claim 15, wherein the registration data includes user data and device data.

20. The method of claim 15, wherein the service comprises a 5G network service.

* * * * *